(12) United States Patent
Benz et al.

(10) Patent No.: US 8,057,356 B2
(45) Date of Patent: Nov. 15, 2011

(54) METHOD FOR CONTROLLING A CLUTCH

(75) Inventors: Juergen Benz, Oberkirch (DE);
Reinhard Berger, Buehl (DE)

(73) Assignee: LuK Lamellen und Kupplungsbau Beteiligungsgesellschaft KG, Buehl (DE)

( * ) Notice: Subject to any disclaimer, the term of this patent is extended or adjusted under 35 U.S.C. 154(b) by 912 days.

(21) Appl. No.: 10/791,432

(22) Filed: Mar. 2, 2004

(65) Prior Publication Data

US 2004/0176213 A1   Sep. 9, 2004

(30) Foreign Application Priority Data

Mar. 6, 2003  (DE) .................................. 103 09 723

(51) Int. Cl.
*B60W 10/02*   (2006.01)
(52) U.S. Cl. .......................................... 477/80; 477/175
(58) Field of Classification Search .................. 477/70, 477/79, 80, 86, 89, 166, 174, 175, 107
See application file for complete search history.

(56) References Cited

U.S. PATENT DOCUMENTS

| 5,176,234 | A | | 1/1993 | Reik et al. ............... 192/0.052 |
| 5,425,689 | A | * | 6/1995 | Genise ........................ 477/120 |
| 5,454,768 | A | * | 10/1995 | Jones et al. .................. 477/83 |
| 5,547,438 | A | * | 8/1996 | Nozaki et al. .............. 477/169 |
| 5,819,585 | A | * | 10/1998 | Darnell ........................ 74/335 |
| 6,729,198 | B2 | * | 5/2004 | Brandt ........................ 74/337 |
| 6,878,095 | B2 | * | 4/2005 | Shigyo ........................ 477/86 |
| 2004/0138027 | A1 | | 7/2004 | Rustige et al. ............ 477/175 |

FOREIGN PATENT DOCUMENTS

| DE | 3041501 | 11/1980 |
| DE | 40 11 850 | 10/1990 |
| DE | 195 32 946 | 3/1997 |
| DE | 102 21 701 | 11/2002 |
| EP | 0 937 904 | 12/2002 |
| WO | WO 03/076227 | 2/2003 |

* cited by examiner

*Primary Examiner* — David D Le
(74) *Attorney, Agent, or Firm* — Davidson, Davidson & Kappel, LLC

(57) ABSTRACT

A method is described for controlling a clutch which is located between a drive motor and an automated manual transmission of a drive train. In this method, vibrations during load alternations are reduced by controlling the clutch so that a free-wheeling function is implemented during an engine braking mode.

3 Claims, 4 Drawing Sheets

METHOD FOR CONTROLLING A CLUTCH

This claims the benefit of German Patent Application No. 103 09 723.6, filed Mar. 6, 2003 and hereby incorporated by reference herein.

BACKGROUND INFORMATION

The present invention relates to a method for controlling a clutch which is located between a drive motor and an automated manual transmission of a drive train.

Drive trains for motor vehicles in which a manual transmission is connected via a clutch to the drive motor are known from the related art, both the manual transmission and the clutch being operated automatically. Such transmissions and/or drive trains are known as automated manual transmissions in general.

Vehicles, in which the engine and drive train are connected via a friction clutch, may be stimulated to develop vibrations between the engine and the drive train with respect to the vehicle during load alternations or changes. Especially in the case of high transmission ratios, which is the case at low speeds anyway, these vibrations are perceptible in the output. Although this effect is accepted by the driver of a manual transmission, the demand for comfort is greater in the case of automated systems.

BRIEF SUMMARY OF THE INVENTION

An object of the present invention is therefore to reduce the vibrations that occur with load changes.

The present invention provides a method for controlling a clutch which is located between a drive motor and an automated manual transmission of a drive train, the clutch being controlled so that a free-wheeling function is implemented during an engine braking mode. While changing from a drive or traction mode to an engine braking mode (e.g. when the gas pedal is released but the automobile is still in gear), the clutch is disengaged and thus the vibration is damped. The change from an opened drive train to normal driving with a closed drive train must be performed under suitable conditions. Such conditions include both the transitional conditions from driving to free-wheeling as well as strategies for controlling the transition from free-wheeling to driving.

The clutch is preferably disengaged to implement the free-wheeling function. Initial conditions for the free-wheeling function may be the fact that the gear is less than or equal to a maximum gear and/or that the clutch is disengaged to implement the free-wheeling function when the gas pedal has not been operated and/or an idling switch is activated and/or the driver's desired torque is less than zero and/or in addition the speed is less than the maximum free-wheeling speed and/or downhill driving is not detected by a control unit or the like and/or the transmission is shifted to an automatic driving program and/or a creep function is not activated and/or there is no block of the free-wheeling function.

To prevent the vehicle from suddenly switching out of engine braking mode and unexpectedly (for the driver) shifting into free-wheeling, the free-wheeling function is blocked with one or more of the following conditions: when the driving speed is greater than the maximum free-wheeling speed, when no automatic driving program has been activated or when a hill driving program has been activated. Here again, other conditions may also be used.

The block remains in effect at least until one of the following conditions is met: when the gas pedal is operated or the driver's desired torque is greater than zero, when there is a change from a manual driving program to an automatic driving program or when there is a change in gear with a gear lower than or equal to the maximum free-wheeling gear. Here again, other conditions may also be used.

The present invention also provides a drive train in particular for a motor vehicle comprising a drive motor, a manual transmission and a clutch connecting the two in which the drive train includes a controller, which is capable of operating according to one of the preceding methods.

BRIEF DESCRIPTION OF THE DRAWINGS

Exemplary embodiments of the present invention are described in greater detail below on the basis of the accompanying figures, in which.

DETAILED DESCRIPTION

The diagrams in FIGS. 1 through 6 are schematic diagrams of the plots of rotational speed n and engine torque M over time t for the engine.

Figure 1:
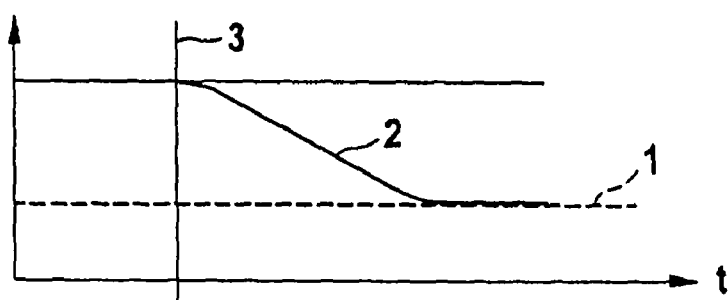
FIG. 1 shows a plot of rotational speed over time in the transition to free-wheeling.

FIG. 1 shows idling rotational speed 1 and engine rotational speed 2 plotted over time t. With the start of free-wheeling phase 3, shown as a vertical line in FIG. 1, the vehicle clutch, which connects a known drive motor to an automated manual transmission, is disengaged. The clutch is controlled automatically by an electric actuator, for example. Shifting of the manual transmission is also performed, e.g., by electrically driven actuators. Such a drive train and/or the respective transmission and its shifting may be referred to in general as an automated manual transmission. As shown in FIG. 1, engine rotational speed n drops to idling rotational speed 1 after the start of free-wheeling phase 3.

Figure 2:
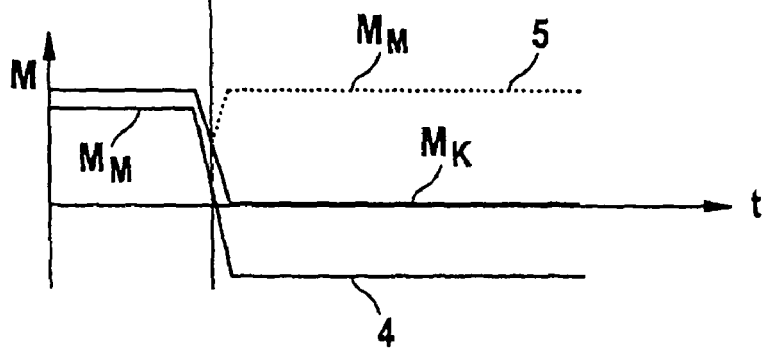
FIG. 2 shows a plot of torque over time in the transition to free-wheeling.

FIG. 2 shows corresponding torque curve M plotted over time t. This shows engine torque $M_M$ and clutch torque $M_K$. As this shows, the clutch torque drops at the start of free-wheeling phase 3, which is represented by a vertical line as shown in FIG. 1, to a clutch torque $M_K$ of zero, while engine torque $M_M$ rises to a free-wheeling torque 5 after the clutch has been finally disengaged. For comparison purposes, torque curve $M_M$ during regular engine braking is shown; in this case a negative drag torque 4 is transmitted to the engine via the clutch.

Figure 3:
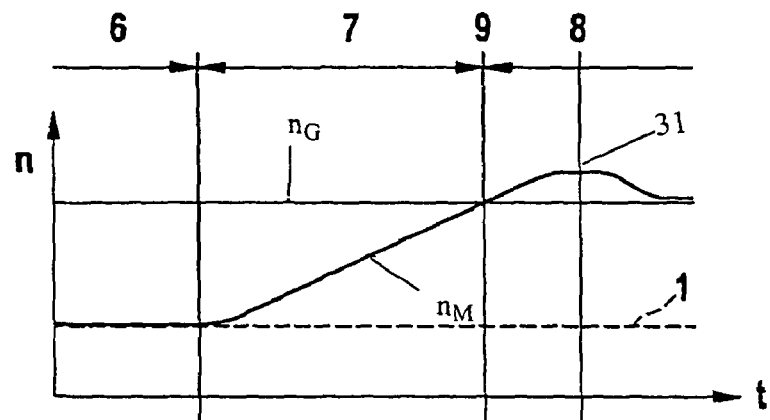
FIG. 3 shows a plot of the rotational speed on reengaging the clutch without an engine torque intervention.

FIG. 3 shows the reengagement of the clutch without engine intervention, where the rotational speed of the engine before engaging the clutch is approximated to the rotational speed of the transmission input shaft. The goal is to ensure virtually unnoticed (by the driver) engagement of the clutch. FIG. 3 shows rotational speed n plotted over time t. Transmission rotational speed $n_G$ is plotted as a horizontal line. According to the diagram in FIG. 1, idling rotational speed 1 of the engine is also shown as a horizontal line. Free-wheeling phase 6, engine acceleration phase 7 and clutch engagement phase 8 are also shown over time. During the engine acceleration phase, engine rotational speed $n_M$ is increased so that it is above the transmission rotational speed during the clutch engagement phase. The transmission rotational speed is measured at the clutch. With steady engagement of the clutch beyond a clutch engagement point in time 9, the rotational speed drops, beginning at point 31, to transmission rotational speed $n_G$ until the clutch is completely engaged.

Figure 4:
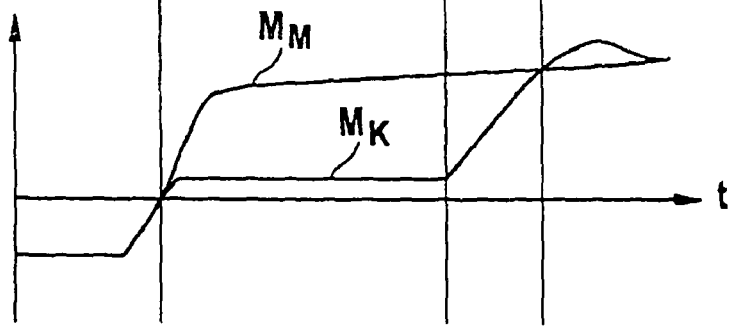
FIG. 4 shows a plot of the torque on reengaging the clutch without an engine torque intervention.

FIG. 4 shows plots of corresponding engine torque $M_M$ and corresponding clutch torque $M_K$. Clutch torque $M_K$ is controlled at a comparatively low level for bracing the drive train during the acceleration phase of the engine and then during the clutch engagement phase is controlled at engine torque $M_M$ and for a brief period of time even above that. In the engaged state, clutch torque $M_K$ corresponds to engine torque $M_M$.

Figure 5:
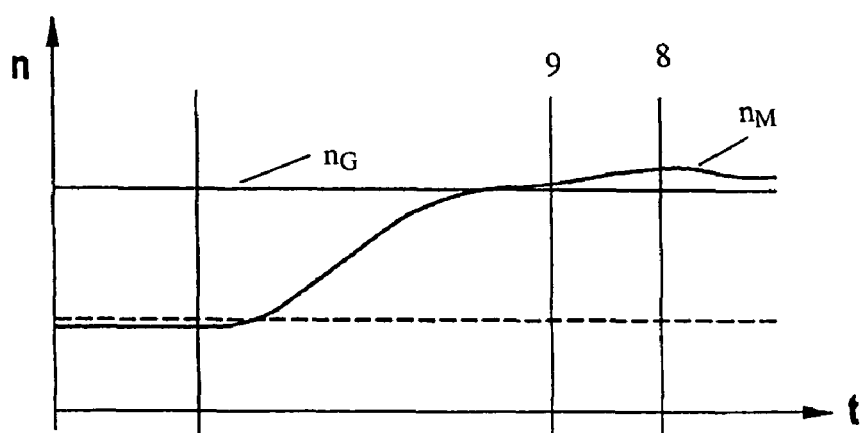
FIG. 5 shows a plot of the rotational speed over time on reengaging the clutch with an engine torque intervention.
Figure 6:
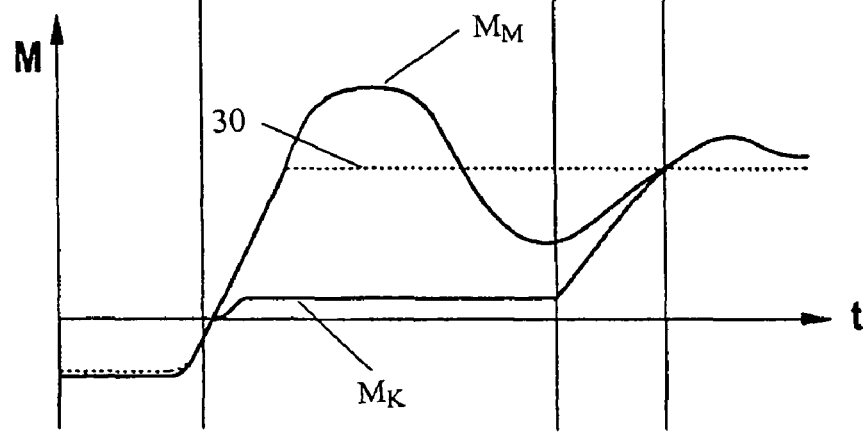
FIG. 6 shows a plot of the torque on reengaging the clutch with an engine torque intervention.

Like the previous diagrams, FIGS. 5 and 6 show rotational speed n and torque M plotted over time t. In contrast with the diagram in FIGS. 3 and 4, the diagrams in FIGS. 5 and 6 shows reengagement of the clutch with engine torque intervention. The plot of the rotational speed shown in FIG. 5 follows approximately the plot of the rotational speed shown in FIG. 3. However, it may be seen that with the plot of the torque shown in FIG. 6, the engine torque is not regulated at a constant level 30 in order to then enter the clutch engagement phase 8, but instead is first regulated at a relatively high level which is then regulated back down to a comparatively low level after the start of the clutch engagement phase.

As an initial condition for the free-wheeling function, different parameters may be selected. First the gear should be less than or equal to a maximum free-wheeling gear. The maximum free-wheeling gear is a predetermined highest gear in which the drive train may be switched to the free-wheeling function. In addition, the gas pedal must not be operated and an idling switch must be switched by the driver to active or the driver's desired torque must be less than zero. An additional condition is that the driving speed must be less than a maximum free-wheeling speed. Above the maximum free-wheeling speed, the vehicle is also not switched to the free-wheeling function. The free-wheeling function is also not activated when driving downhill has been detected. The free-wheeling function is activated only when an automatic driving program is selected and no creep function has been activated.

To prevent the vehicle from coming suddenly out of engine braking mode and unexpectedly (for the driver) switching into free-wheeling mode, the free-wheeling function is blocked when various conditions occur. A block occurs when the driving speed is greater than the maximum free-wheeling speed. Likewise a block occurs when no automatic driving program has been selected and when a hill driving program has been activated. The block remains active until the gas pedal is activated or the driver's desired torque is greater than zero, until there is a change from a manual driving program to an automatic driving program or until there is a gear change with a gear lower than or equal to the maximum free-wheeling gear.

As soon as one of the initial conditions is no longer met, the clutch is engaged again. A distinction must then be made as to whether the reengagement will be in an engine braking or in a drive or traction mode.

To enter an engine braking mode, the clutch is slowly engaged and/or a creep torque is built up.

If the gas pedal is operated on leaving the free-wheeling state, the clutch engages only when the engine rotational speed is above the transmission input rotational speed. The clutch engagement function during drive or traction mode is critical in terms of comfort because the driver does not receive the desired output torque during acceleration of the engine and then the clutch must be engaged relatively rapidly to prevent the engine from racing.

It has proven advantageous to have the clutch already gently applied (only a few newton meters) during engine acceleration. This makes is possible to reduce the dead time for bridging the air gap of the clutch, but also the play in the input shaft is run through in a defined manner at a low torque. Even if the driver operates the gas pedal only slightly, a rapid equalization of the rotational speed may be achieved with a positive torque demand of the engine control and thus the engine acceleration phase may be shortened.

Engagement of the clutch must take place so rapidly that overtorquing of the engine may be prevented. With a reduced torque demand of the engine control, it is possible to produce rough clutch engagement operations and severe overspeed of the engine.

Figure 7:
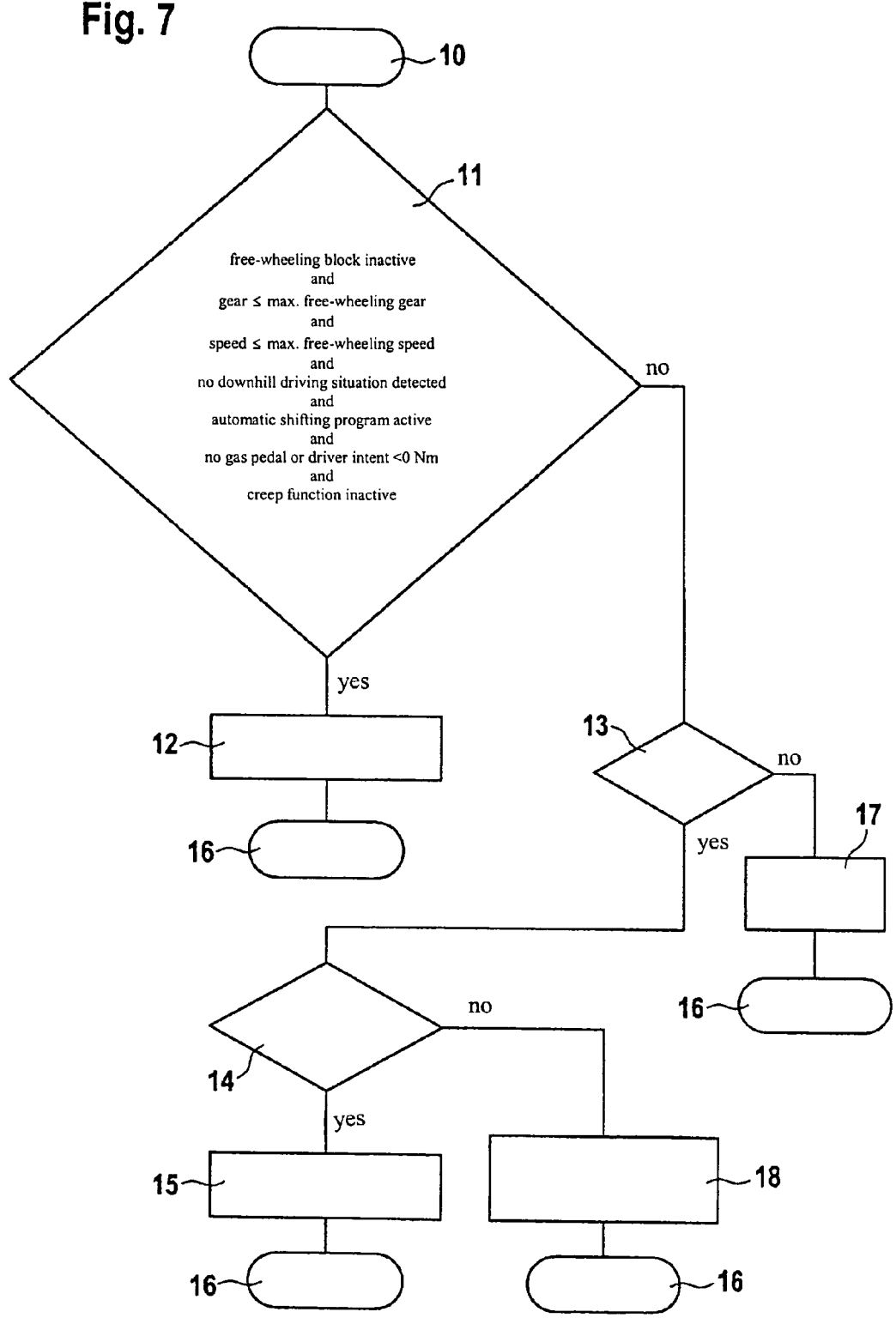
FIG. 7 shows a flow chart for the sequence of the free-wheeling function.
Figure 8:
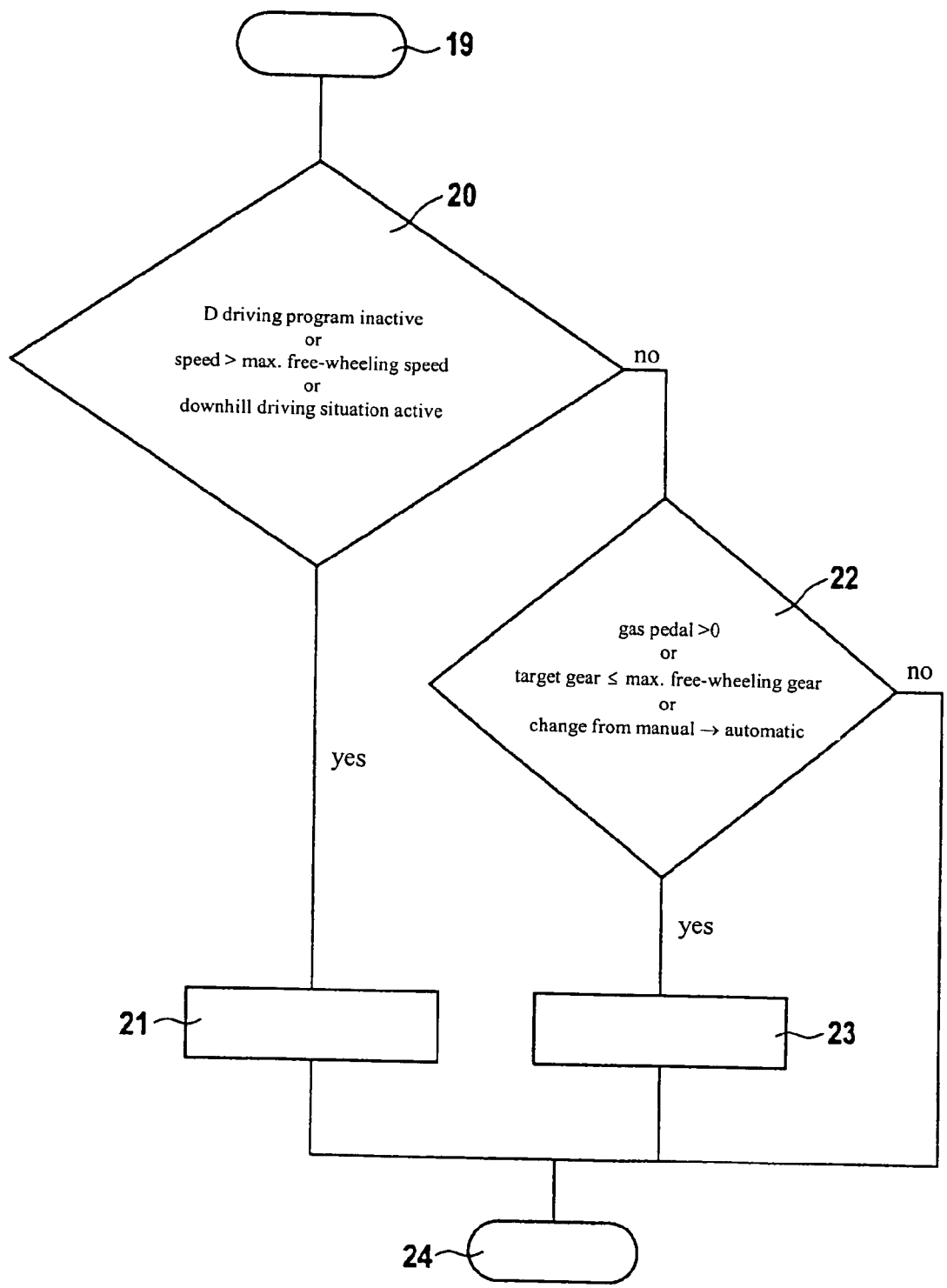
FIG. 8 shows a flow chart for setting the free-wheeling block.

FIG. 7 shows a flow chart for the free-wheeling function sequence; similarly, FIG. 8 shows a flow chart for setting the free-wheeling block. After a starting point in time 10 in FIG. 7, first a check is performed in a first checking step 11 to determine whether the free-wheeling block is inactive and whether the gear is less than or equal to the maximum free-wheeling gear and whether the speed is less than or equal to the maximum free-wheeling speed and whether there is no downhill driving situation and whether an automatic shifting program is active and whether the gas pedal has not been operated or the driver's desired torque is less than zero newton meters and the creep function is inactive. If all of these are correct, then a free-wheeling phase 12 is initiated and the clutch is disengaged. If this is not the case, then in a second checking step 13 a check is performed to determine whether the gas pedal has been operated or whether the driver's desired torque is greater than zero newton meters. If this is the case, then in a third checking step 14 a check is performed to determine whether the engine rotational speed is greater than the transmission rotational speed. If this is the case, then there is a clutch engagement phase with clutch engagement during drive or traction mode 15, whereupon the entire checking procedure is ended at an end 16. If second checking step 13 has been answered in the negative, then it is a clutch engagement phase with clutch engagement to enter an engine braking mode and/or with a creep torque in the buildup 17, whereupon the end 16 is triggered again. If the third checking step 14 has been answered in the negative, then it is an engine acceleration phase in which a low clutch torque is to be applied 18, whereupon the end 16 is triggered again.

FIG. 8 shows a flow chart for setting the free-wheeling block. After start 19, a check is first performed in a step 20 to determine whether a continuous driving program is inactive or whether the speed is greater than the maximum free-wheeling speed or whether a downhill driving situation is activated. If this is the case, then in a step 21 the free-wheeling block is activated. If the check in step 20 has been answered in the negative, then first in a step 22 a check is performed to determine whether the gas pedal has been operated and is thus greater than zero or the target gear is less than or equal to the maximum free-wheeling gear or whether there has been a change between manual shifting and automatic shifting. If this is the case, then in a step 23 the free-wheeling block is deactivated. If the check in step 22 has been answered in the negative, the program is terminated directly at step 24.

LIST OF REFERENCE NOTATION n rotational speed
$n_M$ engine rotational speed
M Torque
$M_M$ engine torque
$M_K$ Clutch
$n_G$ transmission rotational speed
t Time
1 idling rotational speed
2 engine rotational speed
3 start of free-wheeling phase
4 drag torque
5 free-wheeling torque
6 free-wheeling phase
7 engine acceleration phase
8 clutch engagement phase
9 clutch engagement time
10 starting point
11 first checking step
12 free-wheeling phase
13 second checking step
14 third checking step
15 clutch engagement phase
16 End
17 clutch engagement during deceleration or engine braking/creep torque buildup
18 engine acceleration phase with a small clutch torque
19 Start
20 Check of continuous driving program, speed, etc.
21 activation of free-wheeling block
22 gas pedal operated?
23 deactivation of free-wheeling block
24 End

What is claimed is:

1. A method for controlling a clutch located between a drive motor and an automated manual transmission of a drive train, the method comprising:
   controlling the clutch so as to change from an engine braking mode to a free-wheeling mode, wherein the clutch is disengaged to implement the free-wheeling mode when a transmission gear is equal to or less than a maximum free-wheeling gear.

2. A method for controlling a clutch located between a drive motor and an automated manual transmission of a drive train, the method comprising:
   controlling the clutch so as to change from an engine braking mode to a free-wheeling mode, wherein the clutch is disengaged to implement the free-wheeling mode when a vehicle's driving speed is less than a maximum free-wheeling speed.

3. A method for controlling a clutch located between a drive motor and an automated manual transmission of a drive train, the method comprising:
   controlling the clutch so as to change from an engine braking mode to a free-wheeling mode, wherein the clutch is disengaged to implement the free-wheeling mode when no downhill driving is detected.

* * * * *